May 8, 1923.
K. STAHL
STRETCHING DEVICE
Filed June 28, 1920    2 Sheets-Sheet 1
1,454,298
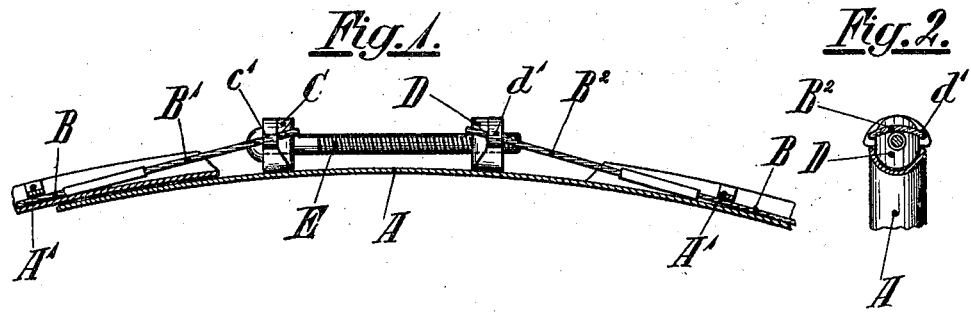
Fig.1.   Fig.2.
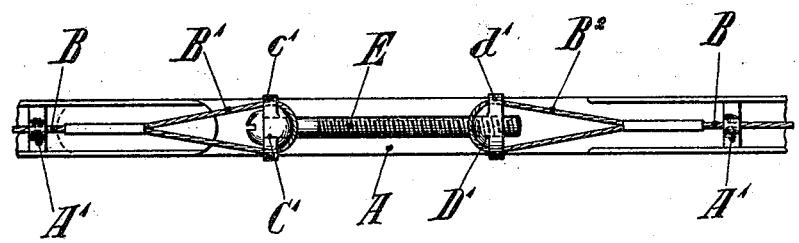
Fig.3.
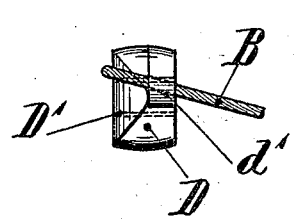 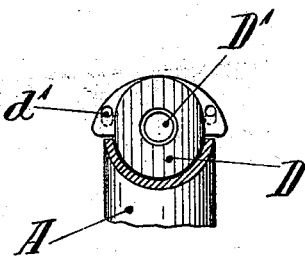
Fig.4.   Fig.5.
INVENTOR:
Karl Stahl.
By [signature]
Attorney May 8, 1923.                                                    1,454,298
K. STAHL
STRETCHING DEVICE
Filed June 28, 1920                    2 Sheets-Sheet 2
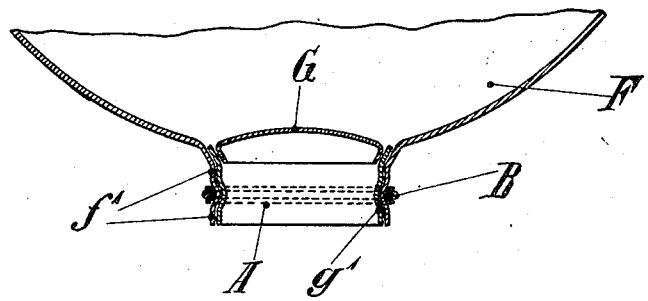
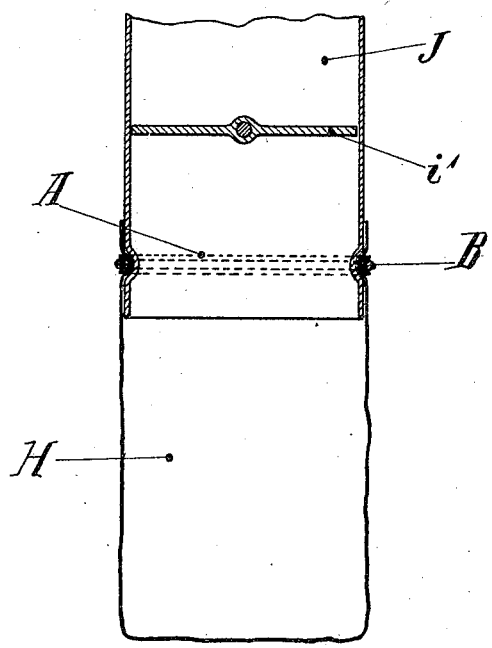
INVENTOR:

Patented May 8, 1923.

1,454,298

UNITED STATES PATENT OFFICE.

KARL STAHL, OF FRIEDRICHSHAFEN, GERMANY, ASSIGNOR TO THE FIRM: LUFT-SCHIFFBAU ZEPPELIN GESELLSCHAFT MIT BESCHRANKTER HAFTUNG, OF FRIEDRICHSHAFEN, GERMANY.

STRETCHING DEVICE.

Application filed June 28, 1920. Serial No. 392,608.

*To all whom it may concern:*

Be it known that I, KARL STAHL, a German citizen, residing at Friedrichshafen, Germany, have invented certain new and useful Improvements in Stretching Devices (for which I have filed application in Germany, January 22, 1917), of which the following is a specification.

My invention relates to devices for securing frame-shaped or plate-shaped bodies in an envelope provided with a suitable opening. More particularly, my invention relates to a device by means of which the annular or ring-shaped frame of the valves used in connection with balloons or airships may be secured to the envelope.

For this purpose there were hitherto employed expansion rings which were adapted to clamp the edge of the envelope placed across the valve frame from the outside and which were directly placed under tension by means of a clamp lever or the like. Now tight drawing expansion rings by such directly acting means embodies numerous drawbacks. For one thing, in order to secure an adequate tensile strength, the expansion ring must be comparatively strong. This, however, entails a loss of the pliancy or suppleness required to secure a reliable fit. Moreover, the attaching of the expansion members to the ends of the rings, proves difficult, and makes it liable for those very parts, which it is desirable to render as rigid as possible, and which ought to be pressed down with particular care, to be bent aside. It is an object of my invention to obviate these drawbacks, and to secure a stretching device, lighter in weight and rendering the stretching operation more reliable, than was possible hitherto by the devices of this kind employed.

As above-mentioned, the subject matter of my invention relates to a stretching means, in particular for securing balloon valves in gas-cells, in the case of which there is provided an open ring, the ends of which are superposed, and having a groove-shaped cross section. The ring is placed under tension, subject to this invention, by drawing tight a special adjustable tension member adapted to move within the groove formed in the ring. Preferably selection will be made for this purpose of a wire rope, the ends of which are connected by means of a turn-buckle. By these means the possibility is secured of making the actual expansion ring of a very thin and easily flexible material, since it will not be required to transmit any tensile forces of any kind whatever. As the wire rope must likewise be very flexible, it may also be very thin; all the more as it is not required to directly secure or fasten the envelope material, whereby this latter would be liable to be cut, but only to exert a pressure in the radial sense which the ring groove interposed suitably tends to distribute. The groove-like formation of the expansion ring promotes, on the one hand, a good distribution of the pressures, on the other, a reliable rope guide. To prevent the formation of any sharp edges, as also to maintain the groove shape, and moreover to be able to always employ the stretching device as an entirety, even though it be composed of a plurality of parts and when not in tension, the ring, in accordance with an additional feature of this invention, is flanged at the edges and provided with guide pieces, in shape corresponding to that of the groove, these members being firmly connected in such a manner with the ring, as to enable them to prevent the wire from slipping out, but not the movements thereof relatively to the ring.

An embodiment of the subject matter of my invention is shown by way of example in the accompanying drawings, in which—

Figs. 1–3 are a longitudinal section, cross section and top view, respectively, of the adjustable portion of the stretching device, Figs. 4 and 5 views of various details on an enlarged scale, and Figs. 6 to 9 illustrate various modes of application, on a reduced scale.

The open ring A, made of a thin and very pliable material and having a groove-shaped cross section, serves to accommodate a wire rope B. To prevent the rope B from slipping out when not stretched, there are provided special guide plates A', uniformly distributed at suitable distances across the ring A. The unattached ends B' and B² of the wire or rope B are looped, and are conducted through appropriate bore holes c', d' formed in a guide member C, and a nut D respectively. The guide C is adapted to rotate freely on the spindle of a screw E, and is by these means adjustably connected to the nut D. The bore holes $c'$ and $d'$ are so devised that they come to lie in one and the same plane with the looped ends $B^1$ and $B^2$, traveling away from the ring; in other words, they come to be disposed obliquely to the main bore holes $C'$ and $D'$ (Fig. 4). By these means, as also by suitably rounding off the adjoining sides of guide member C and off nut D, the rope ends $B^1$ and $B^2$ come to be spared to the utmost extent possible.

In order to prevent the formation of sharp edges, the edges of ring A are preferably flanged. Further, with the view to securing a good fit of the parts of the open ring A projecting beyond one another and encompassing each other in the manner of a cup or bowl, the flanging of the ring edges is not carried through to the end on the one side (Figs. 1 and 2). For the purpose of a good guide action and to secure a shift without any jamming of parts, the guide member C and the nut D are fitted out with laterally projecting nose members, and are moreover rounded off at their lower faces in such wise that they will be able to accurately fit the shape of the envelope (Fig. 5). Besides this, they are rounded off at the lower portion of their forward and rearward faces. The nose portions projecting beyond the edges of the groove-shaped ring section in addition prevent any otherwise possible displacement of the guide member C and the nut D relatively to the screw axis.

The feature of the expansion ring possessing an exact circular or other shape relieved of sharp edges, does not enter within the scope of this invention and is perfectly immaterial thereto. Notwithstanding, the circular shape will in so far be esteemed the most favourable as by its means the distribution of the pressure, effected by the tension member when in tension, will take place most uniformly over the entire circumference of the ring. Besides, the invention will be always found applicable in all cases where the body to be gripped or fastened, does not possess the shape of a frame, but rather, say, that of a plate or disc.

And although the subject matter of this invention is primarily intended for use in connection with aircraft, it may, with equal advantage be always employed where a bag-shaped, that is in its entirety limp body is to be provided with rigid insertions, and the connection is to be established quickly and tightly, and yet so as to again enable a ready detachment or disconnection of parts.

In conformity with the aforesaid explanations, Fig. 6 illustrates a gas cell $f$, the tube-shaped lower end $f'$ of which surrounds a grooved, ring-shaped frame $g'$ of a spring-acted safety valve G. The ring A of the expansion device is forced into the groove of the frame $g'$ by tightening the wire B movably disposed to it. The tube-shaped end $f'$ of the cell, clamped between the frame $g'$ and the ring A is by these means tightly connected to the valve frame $g'$.

In Fig. 7 a grain bag H is connected in a similar manner, say, with the lower end of a sheet metal filling shaft J of a corn-magazine. In the event of the bag requiring to be renewed, the shaft J is temporarily closed by a flap $i''$ operated from without.

Fig. 8 illustrates the connection of two tubes K and K' of air-tight fabric, which possess a considerable internal diameter in order to enable them to transmit large quantities of air possessing only a slight pressure above the atmosphere. The ends of these web conduits, which when not in use are entirely limp, are drawn across an annular intermediate member L, and are mutually tightly connected by means of the improved expansion device. In the very same way also two adjacently disposed ends of sheet metal pipes of big diameter may be interconnected by winding across their ends, which either are in complete or almost complete contact with each other, a strip of a web of adequate width and length, and clamping the one longitudinal side thereof with the one pipe, and the other longitudinal side thereof with the other pipe by means of two stretching devices, one for each side. In this case it is not absolutely necessary for the pipe ends to be provided with grooves.

In Fig. 9 is disclosed the end of the air conduit previously shown in Fig. 8, and here closed by a cap M; the stretching device here, too, securing a thoroughly tight connection of parts.

I claim:

1. In a device of the kind described in combination, a split ring of substantially semi-circular section with ends overlapping one another, a tension means encircling said ring and a turn-buckle connecting the ends of said tension means.

2. In a device of the kind described in combination, a split ring of substantially semi-circular section with ends overlapping one another, a tension means encircling said ring, means on said ring for preventing said tension means from slipping off sideways and a turn-buckle connecting the ends of said tension means.

3. In a device of the kind described in combination, a split ring of substantially semi-circular section with ends overlapping one another, a tension means encircling said ring and a turn-buckle connecting the ends of said tension means, the head and nut of said turn-buckle being rounded so as to fit in the groove of said ring and having grooves extending obliquely with regard to the axis of the turn-buckle.

4. In a device of the kind described in combination, a split ring of substantially semi-circular section with ends overlapping one another, a tension means encircling said ring and a turn-buckle connecting the ends of said tension means, the head and nut of said turn-buckle being rounded so as to fit in the groove of said ring and having grooves extending obliquely with regard to the axis of the turn-buckle and lateral projections on said head and nut.

In testimony whereof I affix my signature.

KARL STAHL.